United States Patent [19]
Stock et al.

[11] Patent Number: 5,768,259
[45] Date of Patent: Jun. 16, 1998

[54] METHOD AND DEVICE FOR MEASURING CHARACTERISTIC MAGNITUDES OF A STREAM OF FIXED LENGTH DATA PACKETS IN A DIGITAL TRANSMISSION SYSTEM

[75] Inventors: Thomas Stock, Zürich; Reto Grünenfelder, Dietlikon, both of Switzerland

[73] Assignee: Alcatel N.V., Rijswijk, Netherlands

[21] Appl. No.: 551,310

[22] Filed: Nov. 1, 1995

[30] Foreign Application Priority Data

Nov. 3, 1994 [CH] Switzerland ............ 03 280/94
Jun. 13, 1995 [CH] Switzerland ............ 01 728/95

[51] Int. Cl.$^6$ .................................................. H04J 3/14
[52] U.S. Cl. .................... 370/252; 370/233; 370/253; 370/395
[58] Field of Search ........................ 370/252, 412, 370/232, 396, 395, 468, 397, 231, 233, 253

[56] References Cited

U.S. PATENT DOCUMENTS

| | | | |
|---|---|---|---|
| 5,029,164 | 7/1991 | Goldstein et al. | 370/396 |
| 5,481,536 | 1/1996 | Reisch et al. | 370/395 |
| 5,602,830 | 2/1997 | Fichou et al. | 370/412 |
| 5,640,388 | 6/1997 | Woodhead et al. | 370/468 |

FOREIGN PATENT DOCUMENTS

0481507  4/1992  European Pat. Off. ......... H04L 12/56

OTHER PUBLICATIONS

International Zurich Seminar on Digital Communications, Mar. 1990—Switzerland, pp. 131-144, F. Denissen et al, "The policing function in ATM networks".

"Modeling and Performance Comparison of Policing Mechanisms for ATM Networks", IEEE Journal on selected areas in communications, vol. 9, No. 3, Apr. 1991, pp. 335 ff.

*Primary Examiner*—Douglas W. Olms
*Assistant Examiner*—Shick Hom
*Attorney, Agent, or Firm*—Ware, Fressola, Van Der Sluys & Adolphson, LLP

[57] ABSTRACT

In digital transmission systems, adapted data units travel at a high throughput rate over large parts as a stream of fixed length data packets, called cells in this instance. The present method permits the measurement of characteristic magnitudes of the cell stream with respect to the respective individual connection to which they belong. It is based on storing from each arriving cell the identification data of the individual connection to which it is allocated, including its relative position in the cell stream. The memory is interrogated during a cell cycle time. A selection is made about which memory spaces within a defined area contain a predetermined identification data belonging to an individual connection. As a function of the selected memory spaces, the determined result, together with the magnitude and the position of the interrogated area, provides a decisive statement of the measured value. Several interrogations can take place within the same cell cycle time, and several measurement results can thereby be obtained. A preferred device for carrying out the method provides a shift register (15) as the memory, which stores the identification data ($a_i$) at the clock rate of the arriving cells. In each cell cycle, a control circuit (16) determines which memory area must be interrogated about what data, which can take place in multiple form. It controls a selector (17), which tests the content of each shift register unit for coincidence with the specified identification data ($a_j$), and establishes a signal bit ($f_i$) if they coincide. An adder (19) calculates the sum $m(a_j)$ of all selected signal bits ($f_i$).

12 Claims, 3 Drawing Sheets

1

METHOD AND DEVICE FOR MEASURING CHARACTERISTIC MAGNITUDES OF A STREAM OF FIXED LENGTH DATA PACKETS IN A DIGITAL TRANSMISSION SYSTEM

TECHNICAL FIELD

The invention is in the area of broad band data transmissions and concerns a method for measuring the characteristic magnitudes of a stream of fixed length data packets, the application of the method for controlling the stream in order to maintain individually agreed upon traffic parameters, and the devices for carrying out the methods.

BACKGROUND OF THE INVENTION

In many areas of application, the transmission of information of any kind takes place today by means of digital data units. The form of the data units is defined as adapted to the transmission medium, it is often even standardized. Examples are the cells of the Asynchronous Transfer Mode (ATM) or the frames of a regional network (MAN—Metropolitan Area Network), or those according to the "Frame Relay" protocol. The transmission media are designed so that the information from several sources is able to use the same physical transmission device simultaneously. In a digital transmission system, the adapted data units often travel as a stream of data packets across wide areas. A data packet is a large amount of data bits which are joined together according to a predetermined packaging pattern. As a rule, a data packet has a packet head which contains addressing or routing data for the data transmission (among others). In an ATM-based telecommunications network, these are for example routing information for a packet-oriented transmission via virtual connections. Depending on the surrounding field (type and means of the data transmission, network, services, procedures), data packets can have a limited variable length or a certain fixed length. Shorter fixed length packets are occasionally called cells, particularly in networks with a data traffic according to the Asynchronous Transfer Mode (ATM). In the following, the cell concept is used for a fixed length data packet, without being limited to ATM cells, however; in this way, the length in particular can be predetermined in any manner, and the addressing or routing information can be adapted to the surrounding field—for which the concept of individual connection is used.

To be able to make the best use of certain transmission devices such as lines, switching units, multiplexers etc., but without on the one hand having to absorb stoppages and the connected cell losses without fees, and on the other without introducing an explicit flow control, agreements regarding the traffic parameters are usually made with the users. To be able to comply with such agreements, the stream of cells must be adapted accordingly on the transmitting side, which is done with the help of so-called "shapers". On the receiving side (at the network access), it must be capable of being tested and cleansed, if necessary, for which so-called "policers" are used, which mark the cells or remove them. A parameter monitor, possibly with the corresponding consequential measures, particularly the rejection of cells, may also be useful or necessary in certain elements within the network, for example if it becomes necessary to protect a transmission unit against overload.

For parameter monitoring, the parameters to be monitored must be defined and suitable means must be available, in order to be able to decide about their compliance. For ATM-based systems, the "Generic Cell Rate monitoring Algorithm" (GCRA) is the state of the art, better known under the "Virtual Scheduling Algorithm" (VSA) and "Continuous-State Leaky Bucket Algorithm" configurations. It uses the reciprocal of the maximum cell value, the "Peak Emission Interval" T, and the cell delay fluctuation tolerance $\tau$, as the parameter. It has the disadvantage that it is not based on a measuring interval of constant magnitude. It has a virtually infinite memory, which means that short-term peak loads fill the virtual memory, so that too quick a decision is made regarding overload during high loads reoccurring much later, if no low load phase has been interposed.

It can also happen over a certain period of time that more cells are accepted by the medium than what corresponds to the "Peak Emission Interval" of the agreement. It is therefore not possible to test a decider, which operates according to the GCRA, by simply adding another decider. An overview of other decision mechanisms in conjunction with the control of the cell stream in ATM networks is provided by the E. P. Rathgeb article: "Modeling and Performance Comparison of Policing Mechanisms for ATM Networks"; IEEE Journal on selected areas in communications, vol. 9, no. 3, Apr. 1991, page 335 ff.

A suitable means for deciding about compliance with the parameters is the measurement of characteristic magnitudes in the cell stream, particularly the rate of cells belonging to a certain individual connection, which means the number of cells per unit of time, and the magnitudes derived therefrom, such as perhaps average values, as well as their fluctuations. A decision about whether a newly arriving cell in the stream corresponds to the agreement regarding the corresponding individual connection, can then be made on the basis of the measured values, although the individual measurement in cell streams, especially in broad band transmissions up to over 600 Mbit/s, produces considerable difficulties. Publications on this subject give the impression that a true measurement cannot be made because of the excessive cost, or with insufficient flexibility at best.

The task exists of making possible the measurement of characteristic magnitudes of the packet stream with regard to the respective connection in a digital transmission system with a high throughput rate of fixed length data packets, which belong to different individual connections.

SUMMARY OF THE INVENTION

The method is based on storing the identification data in each arriving cell of the individual connection to which it is allocated, including its relative position in the cell stream. The memory is interrogated during a cell cycle time. A choice is made as to which memory spaces in a defined area are occupied by a predetermined identification data belonging to an individual connection. The result, as a function of the chosen memory spaces, together with the magnitude and the position of the interrogated area, provides a decisive statement of the measured value. The inquiry is preferably about a certain number of cell identification data arriving last, and about the individual connection belonging to the cell that arrived last. However, it is not limited thereto. In particular, several inquiries can be made during the same cell cycle time and several measurement results can thus be obtained. As a rule, the cell stream always contains empty cells, which are not allocated to any individual connection. These are stored with an identification data as well. If there is no interest regarding the empty cells, an evaluation of the memory for replacement of the identification data can be omitted.

The simplest configuration of the method provides for determining the number of the chosen memory spaces, which means that the function of the chosen memory spaces is a simple addition of binary values, regardless of their origin. An expanded configuration in this regard gives weight to the chosen memory space in a certain manner, for example exponentially according to the age of the entry, so that the result is a weighted sum.

A preferred device for performing the method of the invention provides a shift register as the memory, which stores the identification data at the clock rate of the arriving cells. For purposes of reducing the word length, the identification data is a local one and is produced in the known manner with the help of an identification translator, which identifies the individual connection of an arriving cell. In each cell cycle, a control circuit determines which memory area should be interrogated about what data, which can take place in multiple form. It controls a selector, which tests the content of every shift register unit for conformity with the specified identification data, and inserts a signal bit if it conforms. An adder calculates the sum of all the chosen signal bits. In a more general configuration, the adder is replaced by programmable functional block units.

The means of the invention make a flexible and rapid measurement of the individual characteristics of the cell stream parts possible. Several parameters can be measured, thanks to multiple memory inquiries within one cell cycle time. The magnitude of the measuring interval can be adapted at any time; this allows establishing different lengths of the measuring window for different individual connections. Cascading and parallel configurations of the device allow to increase the flexibility and/or the speed.

Measuring the cell rate enables their quantitative utilization, which means that not only yes/no decisions can be made. For example, the measurement allows a network user to make a corresponding calculation of the output being used. In the end, it remains undecided for which purpose a measurement result is used. However, for control of a cell stream it is of first line importance to be able to affect it in a suitable manner. The decision mechanisms used until now were based on a fairly rough evaluation of very few magnitudes; the known GCRA falls under the above mentioned shortcomings.

A further task therefore exists to refine the means known so far for controlling a cell stream in regard to the compliance with the agreements, and to mark or reject the non-conforming cells.

The results of measuring the characteristic magnitudes provide a good decision basis for guaranteeing that a cell stream complies with the agreements, either by adapting a cell stream, the so-called "shaping", or by testing and carrying out the contract, the so-called "policing", to prevent stoppages. The measuring device is followed by a decider, which evaluates the corresponding measured value with respect to at least one value that is a function of the traffic parameter to be evaluated, while it is possible to consider several measured values at once.

The method works with a measuring window of finite length, and therefore has no memory of the previous actions. Two measuring devices connected to the cell stream at different times are therefore already synchronous after one window time—the maximum of cell cycle times is how many memory spaces are available—and if both operate correctly, they produce the exact same result. A second device can therefore be used to test the first, which is generally not possible to achieve this simply with the deciders that operate by means of the GCRA.

BRIEF DESCRIPTION OF THE DRAWINGS

Other advantageous configuration types can be found in the corresponding claims. In the following, the invention will be explained in greater detail by means of figures.

BEST MODE FOR CARRYING OUT THE INVENTION

Figure 1:
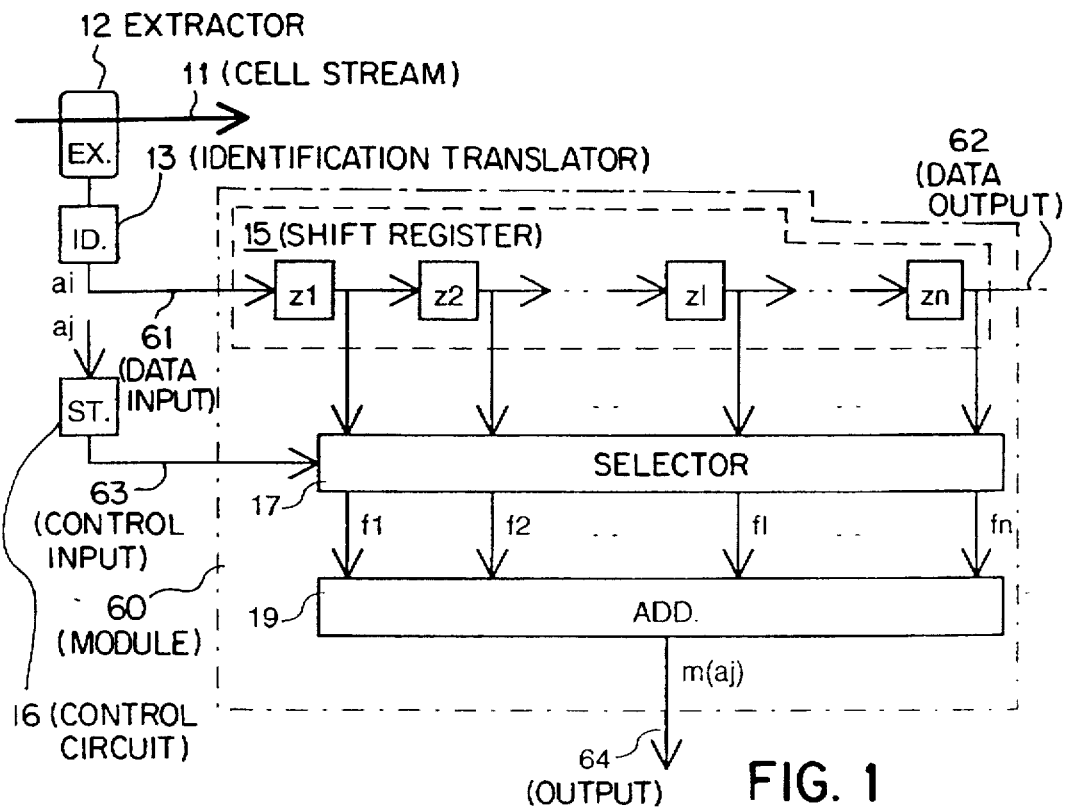
FIG. 1 is a block circuit diagram of a measuring device.

FIG. 1 is the block circuit diagram of a device for measuring characteristic magnitudes of a stream of fixed length data packets, which is composed of packets from different connections, for example ATM cells with different VPI/VCI in the head portion. The cell stream 11 can be recognized, with an extractor (EX.) 12 attached to it, which copies the data about the individual connection i from each arriving cell. An identification translator (ID.) 13 converts this data into an identification data $a_j$. This then goes to a shift register (S.R.) 15 on the one hand, and to a control circuit (ST.) 16 on the other. The shift register 15 has n steps (z). The content of each step is readable—each step output is connected to a selector (SEL.) 17, which indicates the respective number of n outputs. On its side, the selector 17 is influenced by the control circuit 16 through a control input. The selector outputs are routed to an adder (ADD.) 19, whose output delivers the measurement result.

The method of the invention is explained in the following by means of this one example of a device. However, it is not the only possible form. It could be envisioned to use a different form of memory instead of a shift register, by means of the corresponding adaptation or addressing of the control circuit, and of the selector. The reference to the shift register variation should not be considered limiting for carrying out the method. Furthermore, in a more complex and more flexible type of configuration, a generalized functional block can be used instead of a simple adder.

The identification data $a_j$ only has local significance, but needs fewer bits than the individual connection data i; the latter comprises 24 or 32 bits e.g. in the case of a VPI/VCI of an ATM cell, depending on whether it is a user interface or a network interface, while 12 bits should be sufficient for the former—over 4096 connections do not each require simultaneous treatment (address capacity of the network according to the ITU recommendation). As a consequence of this reduction, the width of the shift register, and thereby the number w of the bits to be processed, can be kept smaller at the outputs of the individual steps.

The data of the individual connection i is extracted from each arriving cell; it is converted into the local identification data $a_j$, entered into the control circuit 16 and read into the shift register 15, while the content of the shift register is transported further by one step. The not illustrated clock time of the shift register thus corresponds to the cell cycle time of the cell stream.

The determination of the measurement result can begin immediately after the updating. The control circuit 16 determines where an inquiry is made regarding the result of an identification data $a_j$—the inquiry is usually about the last arrived data—and which window is being considered. The control circuit 16 thus provides an identification data $a_j$ to the selector 17, as well as the lower and the upper boundary of the memory area, which is then searched to find out which memory spaces contain the identification data $a_j$. In most cases the lower boundary denotes the last updated memory space. The lower and upper boundaries together form a selectable number k of the n memory inputs. For each memory space—thus for each shift register step (z)—the selector 17 compares the content with the identification data a within the window determined by the lower and upper boundary. Upon conformity, it inserts a signal bit into the selector output belonging to the respective memory space. The downstream adder 19 forms the sum $m(a_j)$ of these signal bits (f).

With a suitable circuit design, such a determination can take place very quickly, so that several measuring values $m(a_j)$ can be determined within the same cell cycle time, whether for another window or for another individual connection j. In more complex types of configurations, a signal word that is dependent on memory space can be read out instead of the individual signal bit at the selector output, and complex operations can take the place of the simple sum formation, for example an exponential weighting of the individual signal bits or words. The barriers of the required logic (needed space, power loss, etc.) and the available time for the calculation fall under the framework of the professional translation of this principle.

Special applications aside, the characteristics of the empty cells are of little interest, certainly not for the policing. If a measured value $m(a_j)$ is usually determined for the individual connection, and if this cell is empty, the $m(a_j)$ determination may be omitted.

Figure 6:
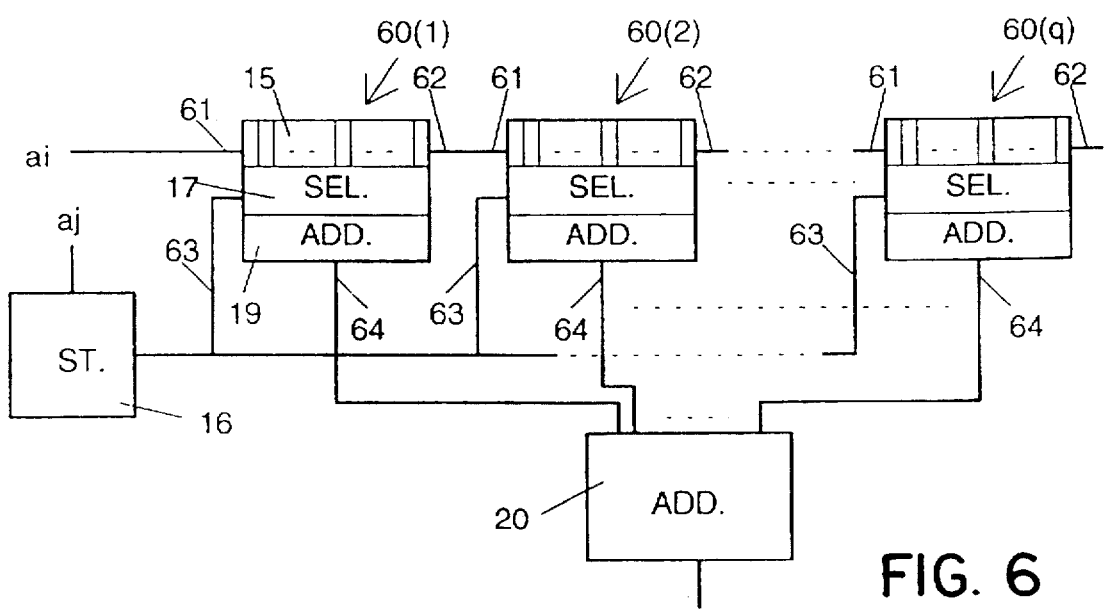
FIG. 6 is a block circuit diagram of a serially expanded arrangement of a measuring device.

It is an advantage if the device according to FIG. 1 is integrated, where the shift register 15, the selector 17 and the adder 19 form a module 60. The module 60 only contains the following inputs and outputs: a data input 61 for entering the identification data a, into the shift register 15, a data output 62 from the shift register 15, a control input 63 into the selector 17 and an output 64 from the adder 19. It is then easy to cascade in order to obtain longer windows as shown in FIG. 6. The shift registers 15 from q modules 60 (1) to 60 (q) for example are placed sequentially behind each other, thus forming a long shift register. The control circuit 16 with the specifiable limit values arranged with respect to the q-times length of a simple module 60, supplies control signals in parallel to all q selectors 17. The q outputs of the adders 19 are routed to an additional adder 20, which forms a result from the sum of the partial q results.

An increase in the processing speed can be achieved by parallelizing. The more expensive part of the device, the shift register 15, then forms a simple configuration in the center. In contrast, the control circuit 16, the selector 17 and the adder 19 are present r-times. The outputs of the shift register steps (z) are connected to all r selectors 17. Every one of the r groups, each comprising a control circuit 16, a selector 17 and an adder 19, operate independently. The respective control circuit determines which identification data $a_j$ and which window are processed. In this way, r different numbers of $m(a_j)$ can be determined simultaneously. Because of the many connections between the shift register and the selectors, a realization is indicated as an integrated circuit.

Figure 5:
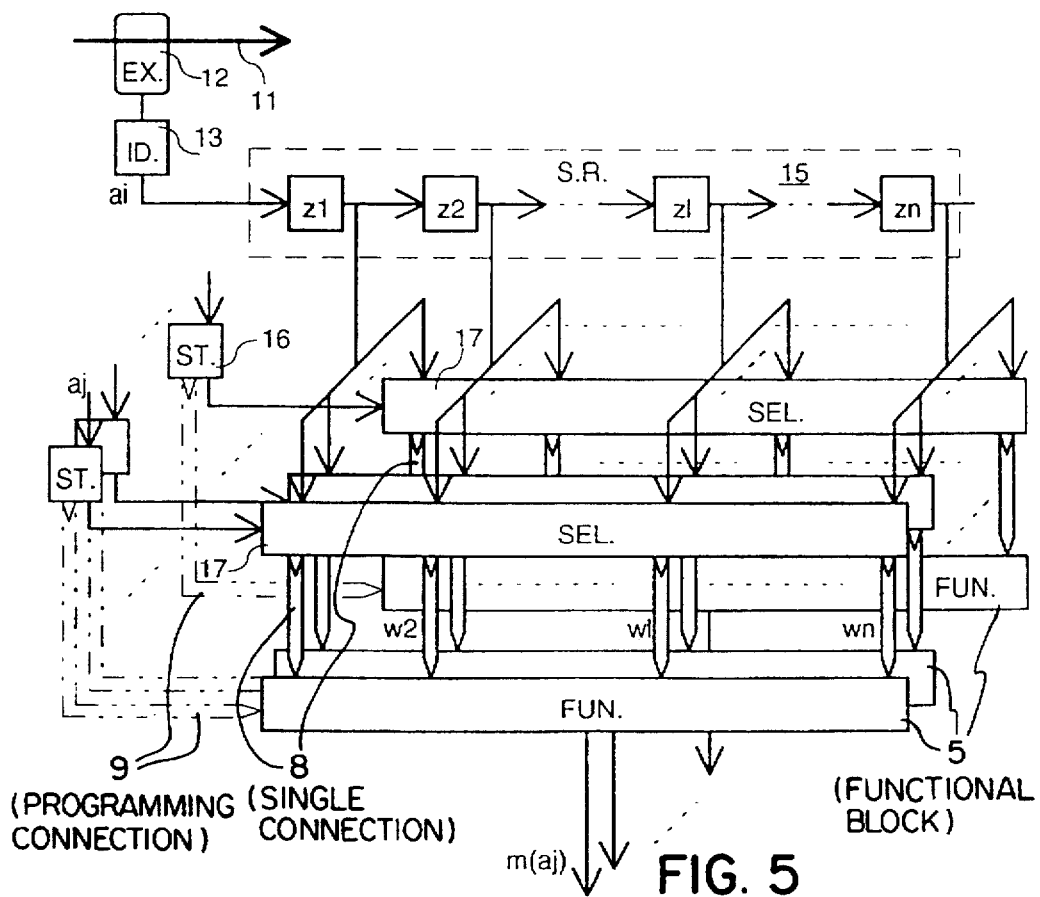
FIG. 5 is a block circuit diagram of a parallelized, generalized arrangement of a measuring device.

Such parallelizing is also possible for the more general configuration, in which the adder is replaced by a programmable functional block. FIG. 5 schematically illustrates such a parallelized arrangement. The extractor (EX.) 12 at the cell stream 11, the identification translator (ID.) 13 and the shift register (S.R.) 15 are unchanged with respect to the variation in FIG. 1. The shift register outputs are connected to r selectors 17, which in turn are connected to a functional block 5. A single connection 8 guides a signal word $w_1$ from selector 17 to functional block 5. The operations in the block, which bring about the function, can be preestablished or specifiable. The control circuit 16 is present r-times as well. If necessary, it can establish the respective function through the programming connection 9.

Figure 2:
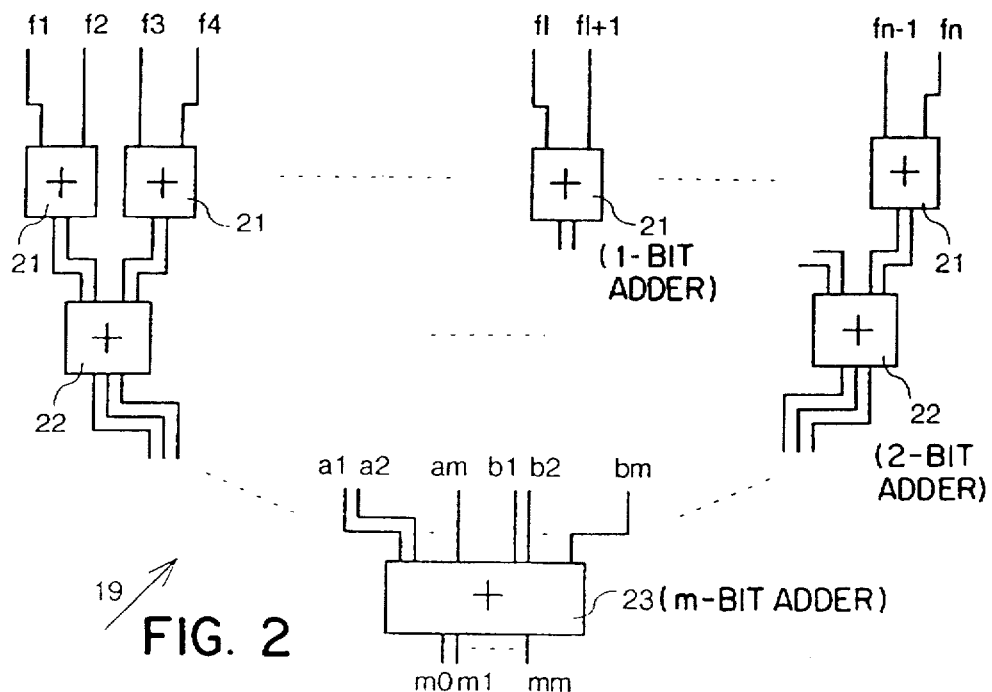
FIG. 2 is the principle of an adder realization.

FIG. 2 schematically illustrates a possible construction of an adder 19 for up to $n=2^m$ signal bits $f_1$ to $f_n$ originating from the selector. A realistic magnitude for n is about 4096(m=12). The addition takes place in several steps. In a first step, two each signal bits $(f_1, f_2, f_3, f_4, \ldots f_{n-1}, f_n)$ are added by the n/2 1-bit adders 21. Two bits from the intermediate results comprising two bits each from the 1-bit adders are added by a 2-bit adder 22, of which n/4 are required. The intermediate results are three bits wide. Continuing this process, the single m-bit adder 23 is reached during the m-th step, and provides the result that is m+1 bits wide. This combinational logic immediately produces the result with only the throughput time of $\log_2$ n steps. For a q-times cascading, the addition of the q results requires further $^2\log$ q steps of the described adder-type. Functional blocks 5, which are able to perform more complex operations, can be constructed in accordance with the same hierarchical principle.

Figure 3:
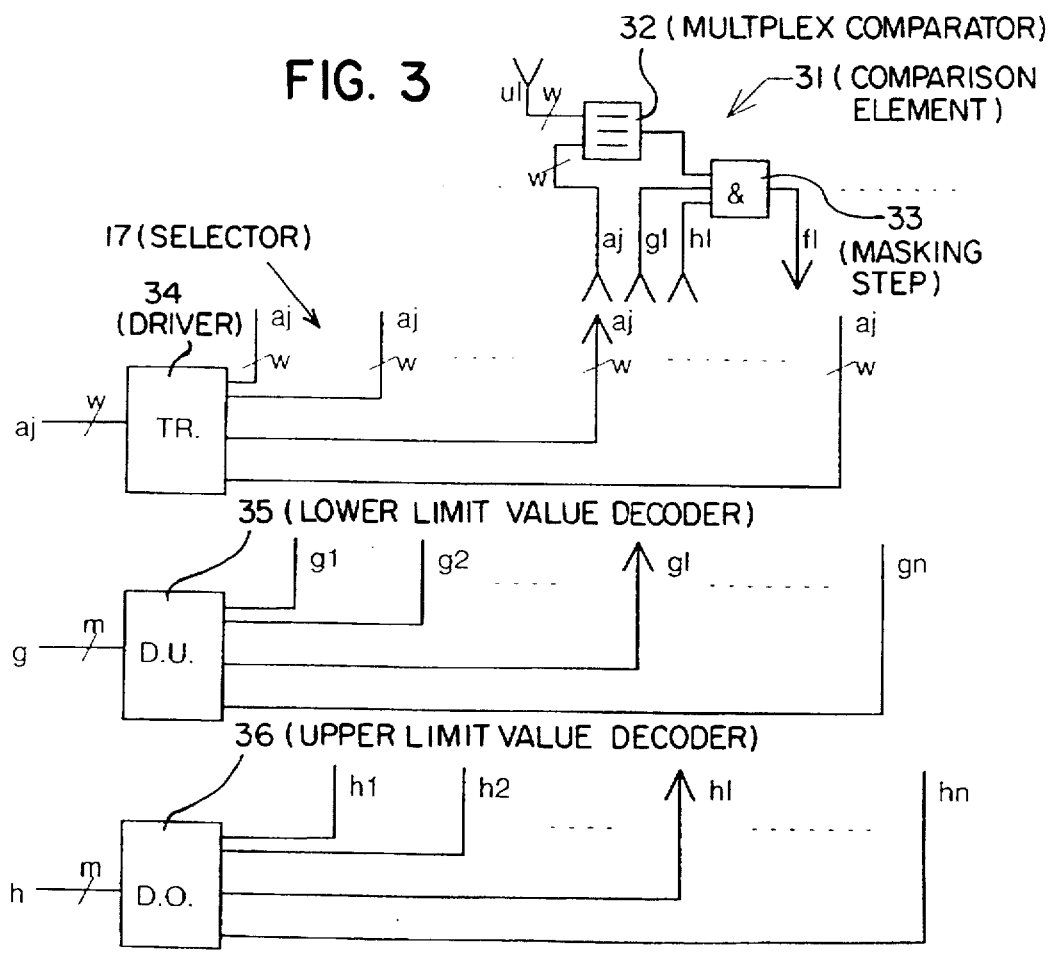
FIG. 3 shows the essential components of a selector.

FIG. 3 illustrates an example of a selector 17 or its essential components. A comparison element 31 contains a multiplex comparator 32 and a masking step 33, and is present n-times. The 1-th element is drawn. In addition, there is a driver (TR.) 34, a decoder for the lower limit value (D.U.) 35, and a decoder for the upper limit value (D.O.) 36 of the memory space, with one each input connected to the control circuit 16 and n each outputs which are individually connected to the n comparison elements 31.

The driver 34 multiplies the identification data $a_j$, a w-wide word, which is located at the input and is specified by the control circuit, and guides it identically to each comparison element 31, more precisely to its multiplex comparator 32. The content $u_l$ of the 1-th step of the shift register 15, also a w-wide word, is connected to the other input of the 1-th multiplex comparator 32. The signal at the output of the multiplex comparator 32 is 1 if the two words coincide, otherwise it is 0. It is guided to the first of the three inputs to the masking step 33, which comprises a simple AND gate. The second input of the 1-th masking step 33 is connected to the 1-th output $g_l$ of the lower limit value decoder of memory space 35, the third to the 1-th output $h_l$ of the upper limit value decoder 36. The lower limit value g is positioned by the control circuit 16 as an m-wide word at the input of the lower limit value decoder 35; it has a value between 0 and n-1. The decoder causes a 0 to be produced at the g outputs $g_1$ to $g_g$, and a 1 at the n-g outputs $g_{g+1}$ to $g_n$. The probably most frequent case of g=0, therefore without an effective lower limit, sets all outputs to 1, so that no masking takes place from below, and the shift register is interrogated by the youngest entry. In principle, the relationships are the same for the upper limit value h+1, where h has a value between 0 and n-1, however the h+1 outputs $h_1$ to $h_{h+1}$ are set to 1, the remaining ones to 0. The instance of h=n-1 sets all outputs to 1, so that no masking takes place from above, and inquiries are made up to the full length of the shift register, therefore up to the oldest entry. Only when the signals at the second and third input to the masking step 33 are one, can the output signal of the multiplex comparator 32 reach the selector output. The signal bit $f_1$ of the selector output is therefore always 0, except when the step 1 is located in the interrogated memory space, and the comparison between $a_j$ and $u_1$ shows a coincidence. The number h+1−g=k of the evaluated memory entries is therefore selectable. In the event of a more complex configuration of the device, the masking step 33 can be expanded and instead of the signal bit $f_1$ a signal word $w_1$ can be emitted, which for example depends on the position of the memory space and the momentary length k.

In an analogous manner, the decoders can be made into an adder, but in this case with an inverted tree; an m-bit wide word is resolved through m=$^2$log n steps into the 1-bit signals at the outputs.

The method is particularly suited for controlling a cell stream so that it complies with the individually agreed traffic parameters—usually at the connection input. The flexible configuration (window width, applicable delay, multiple acquisition) permits the agreement of and monitoring of different parameters. One or more measured values can be specified for a decision regarding whether a certain cell must be marked or removed from the cell stream. The decision then considers one or more values $z_p(a_j)$. These values must be viewed in conjunction with the traffic parameter to be judged. For example, if medium values of cell rates must be related to each other, based on numbers $m(a_j)$ measured in different window lengths, then the value $z_p(a_j)$ must take the respective window length into consideration; however, it could also be weighted.

Figure 4:
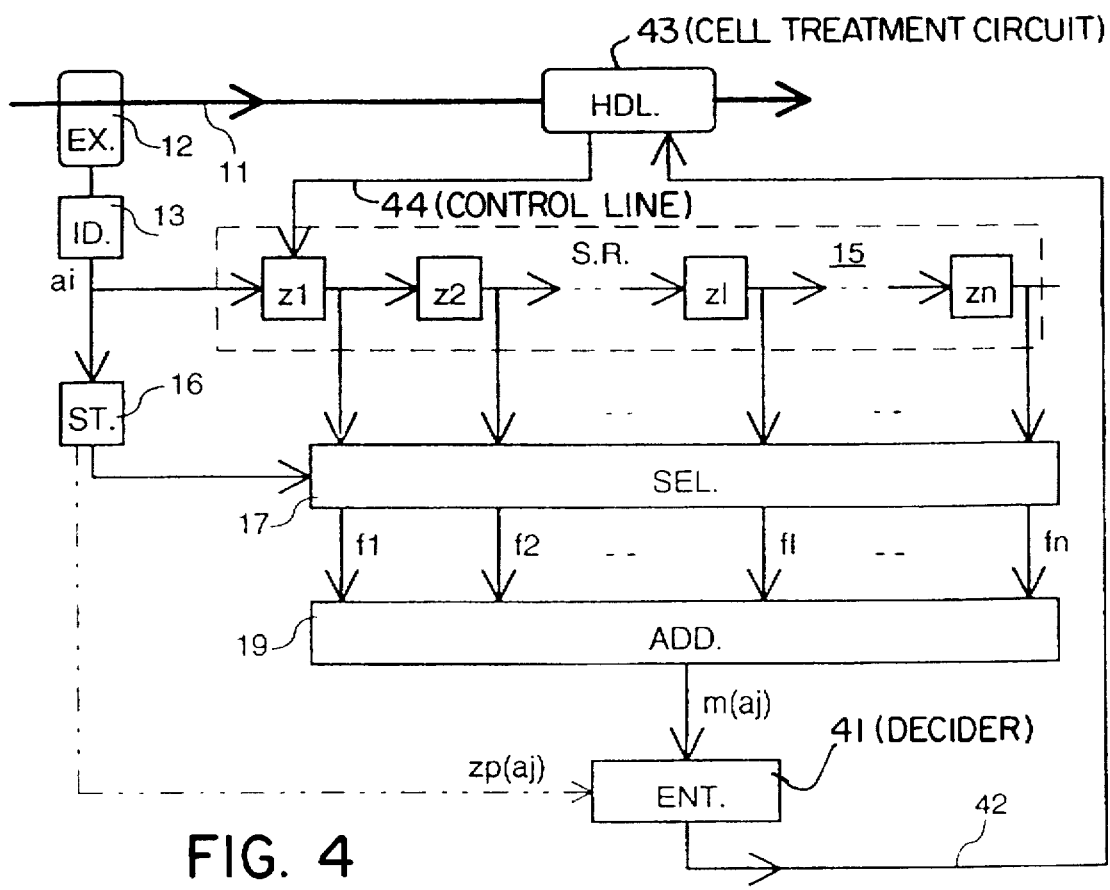
FIG. 4 is a block circuit diagram of a device for using the method to control a cell stream.

FIG. 4 illustrates a device for performing a control of the cell stream by using the above explained device in FIG. 1. The measured result, namely the number $m(a_j)$ of selected memory spaces, is supplied to a decider (ENT.) 41, which also has available the value $z_p(a_j)$. This reference value can be specified by the rest of the system (not illustrated)—as a fixed magnitude in the simplest case—but it can also originate from the control circuit 16. The latter makes sense above all if the control circuit 16 resolves several measurements with different boundary conditions within one cell cycle, where each is then also assigned a pertinent reference magnitude. The result of the decision—passing, marking or rejecting the cell—is sent to a cell treatment circuit (HDL.) 43 through a line 42. The cell stream 11 passes through this circuit 43, essentially a buffer, which keeps the cell available until a decision arrives, the longest during one cycle time, as a rule. Another control line 44 leads from the cell treatment circuit 43 to the first step (z1) of the shift register 15. In the event a cell is rejected and replaced by an empty cell in the cell stream, this connection can serve to make the entry into the shift register 15 coincide with the actual conditions of the cell stream.

The application of the method for measuring characteristic magnitudes in a cell stream to other tasks such as policing and shaping, and the use of described devices or those of the same value for carrying out the method, can easily be recognized by the professional with knowledge of the present invention.

What is claimed is:

1. A method for measuring characteristic magnitudes in a stream of fixed length data packets in a digital transmission system, where each fixed length data packet, hereinafter called a cell, which contributes to the cell stream, contains information about the individual connection to which the cell is allocated, comprising storing an identification data of the individual connection to which the cell is allocated each time a cell arrives, and determining, not later than the arrival of a next cell, a result magnitude for at least one individual connection, at least once from a selectable number of the memory entries which contain the identification data, as a specified or specifiable function of their spaces in the memory, where the determination of the result can be omitted if the identification data refers to an empty cell.

2. The method as claimed in claim 1, characterized in that each space in the memory is allocated a weight, and a weighted sum is determined as the result magnitude.

3. The method as claimed in claim 1, characterized in that the number of the selected memory entries is determined as the result magnitude.

4. The method as claimed in claim 1, characterized in that the determination of at least one result magnitude takes place for those memory entries that contain the identification data belonging to the cell that arrived last.

5. The method as claimed in claim 4, for use in controlling said cell stream for compliance with individually agreed traffic parameters, where cells which do not contain the agreement for their individual connection according to the result of a decision process, are marked or removed from the cell stream, characterized in that the decision process provides at least one value, which depends on the traffic parameter to be evaluated, for at least one measured result magnitude.

6. The method as claimed in claim 5, characterized in that the memory entry for a removed cell is overwritten by one of said memory entries for an empty cell.

7. A device for measuring characteristic magnitudes in a stream of fixed length data packets in a digital transmission system, having an identification translator (13), which identifies at an output the individual connection from an arriving cell and translates it into a local identification data, characterized by said device further comprising a shift register (15), responsive to the output of the identification translator (13), which stores the identification data at the clock rate of the arriving cells, a control circuit (16) responsive to the identification translator, which determines the memory entries to be processed for the identified individual connection, a selector (17), responsive to the control circuit and that receives the identification data from the shift register, which tests the memory entries to be processed for their coincidence with the respective identification data, and establishes at an output a signal word if said identification data coincide, and a functional block (5, 19), whose inputs are connected to the signal word outputs of the selector (17), that calculates the result magnitude.

8. The device as claimed in claim 7, characterized in that the signal word of selector (17) is a single signal bit, and the functional block (5) is an adder (19).

9. The device as claimed in claim 8, that is in a cascaded configuration, characterized in that the shift register (15), the selector (17) and the adder (19) exist q-times, where q is a positive integer, where the q shift registers (15) are switched in series, the q adders (19) are expanded with another adder (20), which forms the sum of q results into the result magnitude ($m(a_j)$), and all q selectors (17) are connected to the control circuit (16).

10. The device as claimed in claim 7 in a parallel configuration, characterized in that the control circuit (16), the selector (17) and the functional block (5) exist r-times, where r is a positive integer, where each of the r control circuits (16) determines the memory entries to be processed for a respectively identified individual connection, so that r individual result magnitudes are produced.

11. The device as claimed in claim 7, for controlling the stream of fixed length data packets further comprising a decider (41) inserted behind the functional block (5), which performs the decision process.

12. The device as claimed in claim 11, characterized in that the control circuit (16) is connected to the decider (41) and provides it with at least one value.

* * * * *